United States Patent
Conti et al.

(10) Patent No.: US 6,713,102 B2
(45) Date of Patent: Mar. 30, 2004

(54) SUGAR WAFERS

(75) Inventors: Claudia Conti, York (GB); Garry Dean Moppett, Windsor (GB)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/785,398

(22) Filed: Feb. 20, 2001

(65) Prior Publication Data

US 2001/0043970 A1 Nov. 22, 2001

Related U.S. Application Data

(63) Continuation of application No. PCT/EP99/04905, filed on Jul. 13, 1999.

(30) Foreign Application Priority Data

Sep. 8, 1998 (GB) .............................................. 9819564

(51) Int. Cl.$^7$ .............................................. A21D 13/00
(52) U.S. Cl. ......................... 426/94; 426/138; 426/549; 426/552; 426/553
(58) Field of Search .................. 426/94, 138, 139, 426/549, 552, 553

(56) References Cited

U.S. PATENT DOCUMENTS

| | | | | |
|---|---|---|---|---|
| 3,814,819 A | * | 6/1974 | Morgan | 426/72 |
| 4,629,628 A | * | 12/1986 | Negro | 426/138 |
| 5,709,898 A | * | 1/1998 | Biggs et al. | 426/297 |
| 5,770,248 A | * | 6/1998 | Leibfred et al. | 426/93 |

FOREIGN PATENT DOCUMENTS

| | | | |
|---|---|---|---|
| DE | 19648506 | * | 10/1997 |
| HU | 70252 T | * | 9/1995 |
| JP | 11-075677 | * | 3/1999 |
| WO | WO 9902042 | * | 1/1999 |

OTHER PUBLICATIONS

The Wholefood Catalog, 1988, p. 12.*
Fresh Ways with Pastries & Sweets, 1988, pp. 116–117.*
Cookies & Crackers, 1982, pp. 34–35.*
Manuharkumar, B. et al., "Composite flours containing Indian maize for production of biscuits and wafers," Getreide, Mehl und Brot 32(5):121–124, 1978.*
Barnett C.D., "South American plant Utilizers native raw materials," Candy and Snack Industry 138(2):30–32, 1973.*

* cited by examiner

Primary Examiner—Lien Tran
(74) Attorney, Agent, or Firm—Winston & Strawn LLP

(57) ABSTRACT

A sugar wafer batter containing wheat flour, cereal grits, sucrose, and water, optionally with some or all of the sucrose replaced with a reducing sugar; or wheat flour, sucrose, a reducing sugar, and water. The sugar wafer batter is baked to make sugar wafers that are harder, more crunchy, and having a more coarse and gritty texture than a conventional sugar wafer. After the sugar wafer batter is baked, the resulting sugar wafers can be further processed for an extended period of time but still retain their characteristic and desirable crispiness when cooled. The sugar wafers can be used in a variety of confectionery products.

21 Claims, No Drawings

SUGAR WAFERS

CROSS REFERENCE TO RELATED APPLICATIONS

This application is a continuation of the U.S. national phase designation of PCT application No. PCT/EP99/04905, filed Jul. 13, 1999, the entire content of which is expressly incorporated herein by reference thereto.

FIELD OF THE INVENTION

The present invention relates to edible wafers, in particular sugar wafers, and to a process for preparing them.

BACKGROUND OF THE INVENTION

Wafers are normally made from batter recipes using from about 20% to 60% by weight of flour, water, and sucrose (which may be brown or white) together with smaller quantities of one or more ingredients typically used in a sugar wafers, such as fat, milk, cream, milk powder, whole egg, egg powder, soya flour, salt, lecithin, colorings, cocoa powder, flavors, emulsifiers, vanilla crystals, and a raising agent. The flour is usually wheat flour but it may be another flour, such as rice flour or a flour admixed with a starch. Wafers typically have a low fat content, normally from 1 to 2% but in some cases can be up to 10%. The main function of the fat is as an anti-sticking/releasing agent. Sugar wafers differ from standard wafers in that they contain a higher sugar content, for example, from about 40% to 70% compared with less than 5% for standard wafers.

Wafers may be distinguished from biscuits/cookies in that wafers are the result of baking a batter whereas biscuits/cookies are baked out of dough. Batter normally has a water content of more than 100 parts per 100 parts of flour and is a liquid suspension that will flow through a pipe. In contrast, biscuit dough is rather stiff so that it can be rolled and flattened and has a water content of less than 50 parts per 100 parts of flour.

A major problem with standard sugar wafers is that they tend to lose their crispiness over time by absorbing moisture which softens them. Thus, the wafers lose their characteristic and desirable textural properties. After baking the batter, there is only a limited amount of time, usually up to about 40 seconds, during which the wafers stay sufficiently flexible to allow further processing, such as modifying the shape of the wafer or filling a tubular shaped wafer.

SUMMARY OF THE INVENTION

The invention relates to a sugar wafer batter. The sugar wafer batter includes:

(i) a grain component comprising wheat flour and cereal grits in an amount sufficient to be baked into a crisp wafer; a sugar additive comprising sucrose, a reducing sugar, or a mixture thereof in an amount sufficient to provide a sweet taste to the wafer; and water in an amount sufficient to form a batter; or (ii) a grain component comprising wheat flour in an amount sufficient to be baked into a crisp wafer; a sugar additive comprising sucrose and a reducing sugar in an amount sufficient to provide a sweet taste to the wafer; and water in an amount sufficient to form a batter.

When the grain component contains cereal grits the ratio of wheat flour to cereal grits may be from 10:90 to 80:20. The cereal grits may be corn grits, maize grits, wheat grits, oat grits, rice grits, or a combination thereof.

Water is present in the wafer batter in an amount of from 100 to 160 parts by weight per 100 parts by weight of the grain component. The sugar additive is present in an amount of from 50 to 100 parts by weight per 100 parts by weight of the grain component. When the sugar additive contains a reducing sugar, the ratio of sucrose to reducing sugar may be from 85:15 to 20:80. The reducing sugar may be fructose, glucose, glucose syrup, dextrose, corn syrup, invert sugar, a fruit juice containing a reducing sugars, honey, or a mixture thereof.

The invention also relates to a process for preparing a sugar wafer. The process involves baking the sugar wafer batter for 0.5 to 2 minutes at a temperature of from 140° C. to 180° C.

The invention also relates to a sugar wafer containing fat, wheat flour, cereal grits, sucrose, and water, wherein the combination of fat, wheat flour, cereal grits, sucrose, and water account for at least 95 percent by weight of the sugar wafer; the amount of water in the sugar wafer is from about 0.5% to 6% by weight based on the weight of the sugar wafer; the sucrose is present in an amount of from 50 to 100 parts by weight per 100 parts by weight of the wheat flour and cereal grits; and the ratio of wheat flour to cereal grits to is from 10:90 to 80:20. Optionally, 15 percent to 80 percent of the sucrose may be replaced with a reducing sugar. In another embodiment the sugar wafer contains fat, wheat flour, sucrose, a reducing sugar, and water, wherein the combination of fat, wheat flour, sucrose, a reducing sugar, and water account for at least 95 percent by weight of the sugar wafer; the amount of water in the sugar wafer is from about 0.5% to 6% by weight based on the weight of the sugar wafer; the sucrose and reducing sugar are present in an amount of from 50 to 100 parts by weight per 100 parts by weight of the wheat flour; and the ratio of sucrose to reducing sugar is from 85:15 to 20:80.

The sugar wafer may further contain one or more of milk, cream, milk powder, whole egg, egg powder, soya flour, salt, lecithin, vanilla crystals, or a raising agent.

The invention further relates to a confectionery product containing a sugar wafer of the invention and a second confectionery material having a water activity below 0.5, wherein the second confectionery material is in direct contact with the sugar wafer. In another embodiment the confectionery product contains a sugar wafer of the invention, a second confectionery material, and a moisture barrier between the sugar wafer and the second confectionery material.

DETAILED DESCRIPTION OF THE PREFERRED EMBODIMENTS

The present invention provides a sugar wafer batter wherein part of the wheat flour is replaced by cereal grits and/or all or part of the sucrose is replaced by a reducing sugar. We have found that by replacing part of the wheat flour in a wafer batter by cereal grits and/or replacing all or part of the sucrose with a reducing sugar, it is possible to obtain a sugar wafer that is sufficiently flexible over a longer period of time compared with standard sugar wafers. Thus, the sugar wafers of the invention can be further processed while retaining their characteristic and desirable crispiness when cooled. In addition, it is possible to obtain a sugar wafer which is harder, more crunchy, and has a more coarse and gritty texture than a conventional sugar wafer.

The cereal grits may be, for example, corn grits, maize grits, wheat grits, oat grits, rice grits, and the like, or any combination of two or more thereof.

The amount of water in the sugar wafer batter of the present invention is typically from 100 to 160 parts and more preferably from 120 to 140 parts by weight per 100 parts by weight of the flour or, where part of the wheat flour is replaced by cereal grits, per 100 parts of the total weight of the wheat flour and cereal grits.

The amount of sucrose or, where all or part of the sucrose is replaced by a reducing sugar, the total amount of sucrose and reducing sugar in the sugar wafer batter of the present invention is typically from 50 to 100 parts and more preferably from 60 to 85 parts by weight per 100 parts by weight of the flour or, where part of the wheat flour is replaced by cereal grits, per 100 parts of the total weight of the wheat flour and cereal grits.

In a first embodiment of the invention, up to 90% by weight of the wheat flour in a standard sugar wafer batter is replaced by the cereal grits. Preferably from 20% to 60% and more preferably from 25% to 45% by weight of the wheat flour is replaced by the cereal grits.

Corn grits are also known as corn meal and is a ground product obtained by dry milling the endosperm of corn. The particle sizes typically vary from about 100 microns to about 1 mm, and preferably from 150 to 500 microns.

In a second embodiment of the invention, all or part of the sucrose in a standard sugar wafer batter is replaced by a reducing sugar. For example, from 15 to 80% by weight of the sucrose may be replaced by the reducing sugar. Preferably from 20% to 50% and more preferably from 25% to 40% by weight of the sucrose is replaced by the reducing sugar. The reducing sugar may be, for example, fructose; glucose; glucose syrup; dextrose; corn syrup; invert sugar; fruit juices containing reducing sugars, such as grape juice; or honey.

Advantageously, both part of the flour in a standard sugar wafer batter is replaced by cereal grits and part of the sucrose in a standard sugar wafer batter is replaced by a reducing sugar.

The sugar wafers may be prepared by baking the sugar wafer batter of the invention. The sugar wafer batter may be baked by any conventional method well known to those skilled in the art to make a sugar wafer. For example the sugar wafer batter may be baked using a baking oven, a baking machine, a molding cone, baking plates, or on the surface of a sugar wafer drum. The baking temperature may be from 140° C. to 180° C., preferably from 150° C. to 170° C., and more usually from 160° C. to 165° C. The baking may be carried out over a period of from 0.5 to 2 minutes and preferably from 0.75 to 1.5 minutes.

Accordingly, the present invention also provides a sugar wafer in which part of the flour is replaced by cereal grits and/or all or part of the sucrose is replaced by a reducing sugar.

The amount of water in the sugar wafer according to the present invention is typically from about 0.5% to 6% and preferably from 0.75 to 3% by weight based on the total weight of the sugar wafer. The remaining ingredients of the sugar wafer according to the present invention, based on the weight of the wheat flour or, where part of the wheat flour is replaced by cereal grits, per 100 parts of the total weight of the wheat flour and cereal grits, remain substantially the same.

The total amount of water, fat, wheat flour, and sucrose together with their replacements in the sugar wafer usually accounts for at least 95%, for example, from 96% to 98% by weight of the sugar wafer. The remaining ingredients include one or more ingredients typically used in a sugar wafers, such as milk; cream; milk powder; whole egg; egg powder; soya flour; salt; lecithin; colorings, such as caramel color; cocoa powder; flavors; emulsifiers; vanilla crystals; and a raising agent.

The sugar wafers of the present invention may have a variety of shapes and sizes, for example, they may be flat sheets, cup or cone-shaped, or they may be tubular. If desired, the sugar wafers may be further processed after baking, for example, they may be crimped, pressed, or shaped in a mold. The sugar wafers of the present invention may be used in a variety of confectionery products together with confectionery materials such as ice creams, chocolates, or other fatty materials such as fat-based creams. The tubular wafers may be filled with confectionery materials, preferably of low water activity so that a minimum of moisture migration occurs. For example the confectionery material may be a savory filling, ice cream, or fat-based creams containing yoghurt. The sugar wafers of the present invention are sufficiently flexible under ambient conditions after baking for more than 40 seconds, preferably more than 50 seconds, and more preferably up to 70 seconds or more to enable further processing.

The present invention further provides a confectionery product comprising a sugar wafer according to the present invention together with a confectionery material. The sugar wafer may be in direct contact with the confectionery material or, if desired, a moisture barrier may be used between the surface of the sugar wafer and the confectionery material. For example, the moisture barrier may conveniently be coated on the surface of the sugar wafer adjacent to the confectionery material. Any conventional food-acceptable moisture barrier may be used. Preferably a fat-based moisture barrier such as chocolate or chocolate substitute is used as the moisture barrier. When the confectionery product comprising the sugar wafer is used in direct contact with a confectionery material, the confectionery material preferably has a low water activity, for example, a water activity below 0.5 and preferably below 0.3.

The confectionery product comprising the sugar wafer may, if desired, be enrobed with another suitable confectionery material, for example, with plain, white, or milk chocolate or with a chocolate substitute.

The confectionery product comprising the sugar wafer may be refrigerated or frozen.

EXAMPLES

The invention is further defined by reference to the following examples describing in detail the preparation of the sugar wafers of the present invention. The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

Example 1

A sugar wafer batter is prepared having the following ingredients:

| | |
|---|---|
| Water | 41.8% |
| Wheat flour | 19.4% |
| Corn grits | 12.9% |
| Brown sugar | 15.3% |

-continued

| A sugar wafer batter is prepared having the following ingredients: | |
|---|---|
| Honey | 7.9% |
| *Other ingredients | 2.7% |

*Other ingredients includes milk powder, egg powder, soya flour, salt, lecithin, and vanilla crystals.

The above batter is fed as a suspension onto the surface of a drum of a wafer baking machine and baked at 162° C. for 1 minute to form a wafer sheet having a water content below 5% by weight. The wafer sheet is then passed to a spindle and rolled to form a tube. The tube is filled with a fat-based cream containing yoghurt, closed at each end, and shaped mechanically as desired. The wafer is sufficiently flexible for a period of 60 seconds after baking which allows this further processing. The tube is finally enrobed with a layer of plain chocolate. The resulting product is then refrigerated.

On eating the resulting product, a panel of seven expert tasters found that the wafer was harder, more crunchy, and had a more coarse and gritty texture than a conventional sugar wafer. These findings were supported by mechanical and sensory analysis.

Immediately after baking, the sugar wafer was found to remain flexible for over 100 seconds which is significantly longer than a standard wafer. Moreover, the cooling rate was reduced compared to a standard wafer, and the temperature at which the wafer became brittle was also reduced to 77° C. compared with 93° C. for a standard wafer.

What is claimed is:

1. A sugar wafer batter comprising:
    a grain component comprising wheat flour and cereal grits in an amount sufficient to be baked into a crisp wafer;
    a sugar additive comprising sucrose, a reducing sugar, or a mixture thereof in an amount sufficient to provide a sweet taste to the wafer; and water in an amount sufficient to form a batter;
    wherein a sugar wafer obtained by baking the batter is sufficiently flexible under ambient conditions for more than 40 seconds to 100 seconds after baking to enable further processing of the wafer.

2. The sugar wafer batter of claim 1, wherein the grain component contains cereal grits and the ratio of wheat flour to cereal grits is from 10:90 to 80:20.

3. The sugar wafer batter of claim 2, wherein cereal grits are corn grits, maize grits, wheat grits, oat grits, rice grits, or a combination thereof.

4. The sugar wafer batter of claim 1, wherein the water is present in an amount of from 100 to 160 parts by weight per 100 parts by weight of the grain component.

5. The sugar wafer batter of claim 1, wherein the sugar additive is present in an amount of from 50 to 100 parts by weight per 100 parts by weight of the grain component.

6. The sugar wafer batter of claim 1, wherein the sugar wafer is sufficiently flexible for more than 50 seconds to 100 seconds after baking to enable further processing.

7. A process for preparing a sugar wafer comprising baking the sugar wafer batter of claim 1 for 0.5 to 2 minutes at a temperature of from 140° C. to 180° C. to form a sugar wafer.

8. A baked sugar wafer comprising fat, wheat flour, cereal grits, sucrose, and water, wherein the combination of fat, wheat flour, cereal grits, sucrose, and water account for at least 95 percent by weight of the sugar wafer; the amount of water in the sugar wafer is from about 0.5% to 6% by weight based on the weight of the sugar wafer; the sucrose is present in an amount of from 50 to 100 parts by weight per 100 parts by weight of the wheat flour and cereal grits; and the ratio of wheat flour to cereal grits is from 10:90 to 80:20; and whereby the sugar wafer is sufficiently flexible under ambient conditions for more than 40 seconds to 100 seconds after baking to enable further processing of the wafer.

9. The sugar wafer according to claim 8, further comprising one or more of milk, cream, milk powder, whole egg, egg powder, soya flour, salt, lecithin, vanilla crystals, or a raising agent.

10. The sugar wafer of claim 9, wherein 20 percent to 80 percent of the sucrose is replaced with a reducing sugar component.

11. The sugar wafer according to claim 10, further comprising one or more of milk, cream, milk powder, whole egg, egg powder, soya flour, salt, lecithin, vanilla crystals, or a raising agent.

12. A baked sugar wafer comprising fat, wheat, flour, cereal grits, sucrose, a reducing sugar, and water, wherein the combination of fat, wheat flour, cereal grits, sucrose, a reducing sugar, and water account for at least 95 percent by weight of the sugar wafer; the amount of water in the sugar wafer is from about 0.5% to 6% by weight based on the weight of the sugar wafer; the sucrose and reducing sugar are present in an amount of from 50 to 100 parts by weight per 100 parts by weight of the wheat flour and cereal grits; and the ratio of sucrose to reducing sugar is from 80:20 to 20:80; and whereby the sugar wafer is sufficiently flexible under ambient conditions for more than 40 seconds to 100 seconds after baking to enable further processing of the wafer.

13. The sugar wafer according to claim 12, further comprising one or more of milk, cream, milk powder, whole egg, egg powder, soya flour, salt, lecithin, vanilla crystals, or a raising agent.

14. A confectionery product comprising the sugar wafer of claim 8 and a second confectionery material having a water activity below 0.5, wherein the second confectionery material is in direct contact with the sugar wafer.

15. A confectionery product comprising the sugar wafer of claim 10 and a second confectionery material having a water activity below 0.5, wherein the second confectionery material is in direct contact with the sugar wafer.

16. A confectionery product comprising the sugar wafer of claim 12 and a second confectionery material having a water activity below 0.5, wherein the second confectionery material is in direct contact with the sugar wafer.

17. A confectionery product comprising the sugar wafer of claim 8, a second confectionery material, and a moisture barrier between the sugar wafer and the second confectionery material.

18. A confectionery product comprising the sugar wafer of claim 10, a second confectionery material, and a moisture barrier between the sugar wafer and the second confectionery material.

19. A confectionery product comprising the sugar wafer of claim 12, a second confectionery material, and a moisture barrier between the sugar wafer and the second confectionery material.

20. A sugar wafer batter comprising:
    a grain component comprising wheat flour and cereal grits in an amount sufficient to be baked into a crisp wafer;

a sugar additive comprising sucrose and a reducing sugar in an amount sufficient to provide a sweet taste to the wafer, wherein the ratio of sucrose to reducing sugar is from 80:20 to 20:80;

water in an amount sufficient to form a batter;

wherein a sugar wafer obtained by baking the batter is sufficiently flexible under ambient conditions for more than 40 seconds to 100 seconds after baking to enable further processing of the wafer.

21. The sugar wafer batter of claim 20, wherein the reducing sugar comprises fructose, glucose, glucose syrup, dextrose, corn syrup, invert sugar, a fruit juice containing a reducing sugars, honey, or a mixture thereof.

* * * * *